(12) United States Patent
Cathcart

(10) Patent No.: US 10,562,234 B2
(45) Date of Patent: Feb. 18, 2020

(54) GAS SHIELDED INFRARED WELDING AND STAKING SYSTEM

(71) Applicant: Dukane IAS, LLC, St. Charles, IL (US)

(72) Inventor: Paul H. Cathcart, St. Charles, IL (US)

(73) Assignee: Dukane IAS, LLC, St. Charles, IL (US)

( * ) Notice: Subject to any disclaimer, the term of this patent is extended or adjusted under 35 U.S.C. 154(b) by 0 days.

(21) Appl. No.: 15/707,360

(22) Filed: Sep. 18, 2017

(65) Prior Publication Data

US 2019/0084245 A1    Mar. 21, 2019

(51) Int. Cl.
*B29C 65/14*    (2006.01)
*B29C 65/00*    (2006.01)

(52) U.S. Cl.
CPC .... *B29C 65/1412* (2013.01); *B29C 66/00141* (2013.01); *B29C 66/349* (2013.01); *B29C 66/8145* (2013.01)

(58) Field of Classification Search
CPC .......... B29C 65/1412; B29C 66/00141; B29C 66/349; B29C 66/8145
See application file for complete search history.

(56) References Cited

U.S. PATENT DOCUMENTS

| | | | | |
|---|---|---|---|---|
| 4,714,509 A | * | 12/1987 | Gruber | B29C 35/10 156/160 |
| 4,715,923 A | * | 12/1987 | Knoll | B29C 35/08 156/380.9 |
| 5,035,045 A | * | 7/1991 | Bowen | B29C 65/1412 156/273.3 |
| 5,151,149 A | * | 9/1992 | Swartz | B29C 65/1412 156/272.8 |
| 6,134,387 A | | 10/2000 | Toss | |
| 2010/0147459 A1 | | 6/2010 | Nathrop | |

FOREIGN PATENT DOCUMENTS

| | | |
|---|---|---|
| CN | 102935719 A | 2/2013 |
| DE | 10019300 B4 | 7/2006 |
| DE | 202006003323 U1 | 9/2006 |

(Continued)

OTHER PUBLICATIONS

Machine Translation of EP-1415789-A1 (Year: 2004).*

(Continued)

*Primary Examiner* — Daniel McNally
(74) *Attorney, Agent, or Firm* — Nixon Peabody LLP

(57) ABSTRACT

An infrared welding system for joining two parts made of thermoplastic material comprises a pair of infrared heaters for heating the two parts while spaced from each other; and energizing the infrared heaters to emit infrared heat and directing the emitted infrared heat onto selected portions of the opposed surfaces of the parts to melt at least portions of the opposed surfaces, while directing an inert gas onto the selected portions to prevent ignition of the melted thermoplastic material. The two parts are clamped together by moving at least one of the parts toward the other part to press the melted surfaces of the parts into contact with each other. The parts are cooled while they remain clamped together to solidify the molten thermoplastic material and thus weld the two parts together.

8 Claims, 7 Drawing Sheets

(56) References Cited

FOREIGN PATENT DOCUMENTS

EP 1415789 A1 * 5/2004 ........... B29C 65/103
EP 1415789 A1 5/2004

OTHER PUBLICATIONS

"Hot Air Plastic Welding: Nitrogen vs. Air," Polyvance, https://www.youtube.com/watch?y=z54NZ-RLdIg, published Mar. 22, 2016.
"Infrared Heat for Plastics Processing," Heraeus, downloaded at http://www.weisstechnik.be/file/64/IR_Plastics/ on Feb. 16, 2018 (12 pages).
International Search Report and Written Opinion of International Searching Authority for Application No. PCT/US2018/051320, dated Dec. 20, 2018 (13 pages).

* cited by examiner

DETAIL A

GAS SHIELDED INFRARED WELDING AND STAKING SYSTEM

FIELD OF THE INVENTION

This invention relates generally to the welding of thermoplastic materials and, more particularly, to a gas-shielded infrared welding system for use in the welding and staking of thermoplastic materials.

BACKGROUND

The invention pertains generally to infrared (IR) welding. More specifically, the invention relates to the use of IR heaters in the plastic welding industry to melt portions of thermoplastic components being welded together, or staked down. One example of a practical application of IR welding is the welding of two halves of an automotive plastic intake manifold together. Conventional methods of welding such manifolds utilize either hot-gas heating or infrared (IR) heating The hot-gas method utilizes resistive heaters to heat an inert gas and blow it against the surfaces to be melted. The gas itself is the vehicle to transfer the energy to produce the melt from the resistive heater to the plastic surface. The by-product of this method is that an inert gas field surrounds the weld zone preventing oxidation or burning of the plastic. This method has little tolerance for variation in the plastic part. As the part warps closer to, or further from the heater, the temperature of the melt front varies significantly.

The IR method simply utilizes an IR heat source to radiantly heat the plastic to produce the melt. The primary advantage of the IR source is the transmission distance of the infrared energy, which is significantly greater than other means of heating the plastic. The increase in transmission distance allows the part surface to be heated much more consistently, despite variations in the distance between the heater and the part resulting from the part warping toward or away from the heater. The disadvantage of the IR heating method is that the surface of the melt being produced can oxidize or burn, causing a decrease in the strength of the weld as the two parts being welded are joined together.

SUMMARY

In accordance with one embodiment, an infrared welding method for joining two parts made of thermoplastic material comprises positioning each of the two thermoplastic parts adjacent an infrared heater with the two parts spaced from each other; melting at least portions of the opposed surfaces of the two parts by energizing the infrared heaters to emit infrared heat and directing the emitted infrared heat onto selected portions of the opposed surfaces of the parts while directing an inert gas onto said selected portions to prevent ignition of the melted thermoplastic material; clamping the two parts together by moving at least one of the parts toward the other part to press the melted surfaces of the parts into contact with each other; and cooling the two parts while they remain clamped together, in direct contact with each other, to solidify the molten thermoplastic material and thus weld the two parts together.

In a preferred embodiment, the inert gas surrounds the infrared radiation as it impinges on the thermoplastic parts, and the infrared radiation is shielded to confine the infrared radiation to the parts to be melted.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications and equivalent arrangements as may be included within the spirit and scope of invention as defined by the appended claims.

Figure 1:
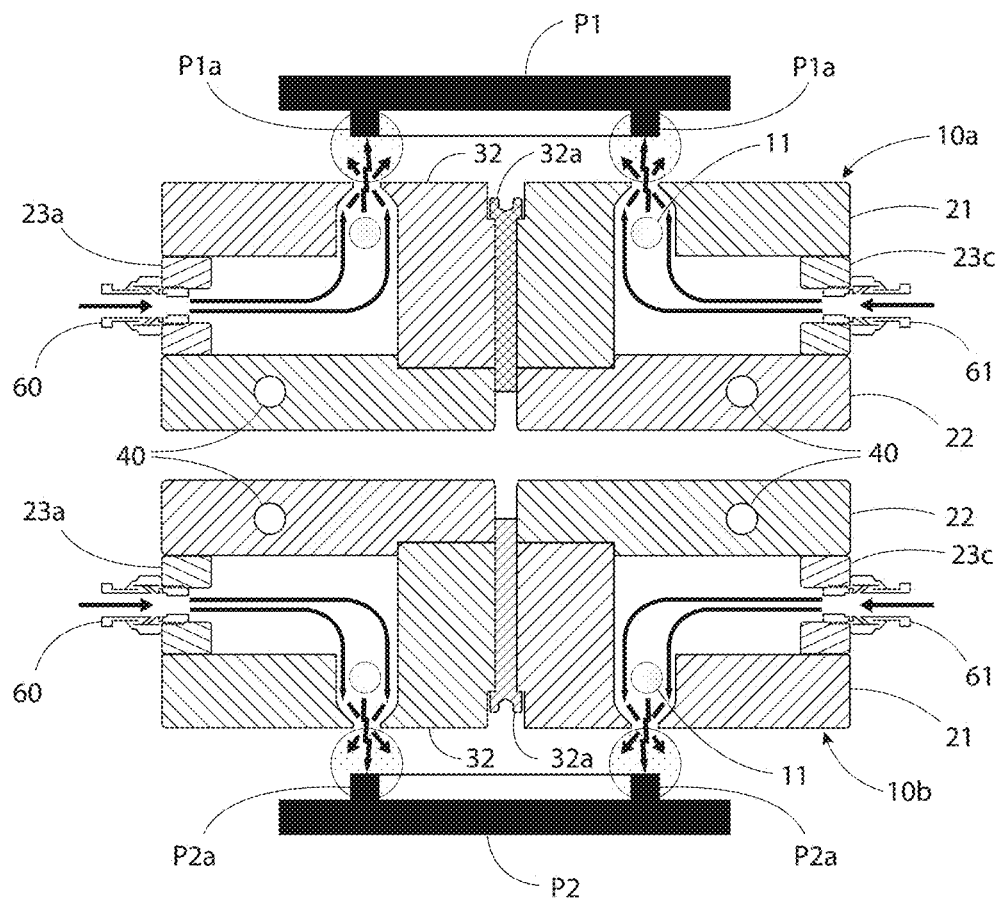
FIG. 1 is a sectional view of a radiant heat welding system formed by two radiant heating units for melting the portions of two thermoplastic parts to be welded.

In the drawings, FIGS. 1-9 illustrate an IR welding system that includes a pair of identical upper and lower radiant heating units 10*a* and 10*b* for heating selected portions of a pair of thermoplastic parts P1 and P2 to be welded to each other. In FIG. 1, the upper heating unit 10*a* heats the part P1, and the lower heating unit 10*b* heats the part P2. The portions of the parts P1 and P2 that are heated are annular ribs P1*a* and P2*a* that extend outwardly from the surfaces of the respective parts P1 and P2 toward the respective heating units 10*a* and 10*b*. The surfaces of the parts P1 and P2 containing the ribs P1*a* and P2*a* face toward each other so that ribs P1*a* and P2*a* can be brought into engagement with each other, after they have been melted, to join the parts P1 and P2.

Figure 2:
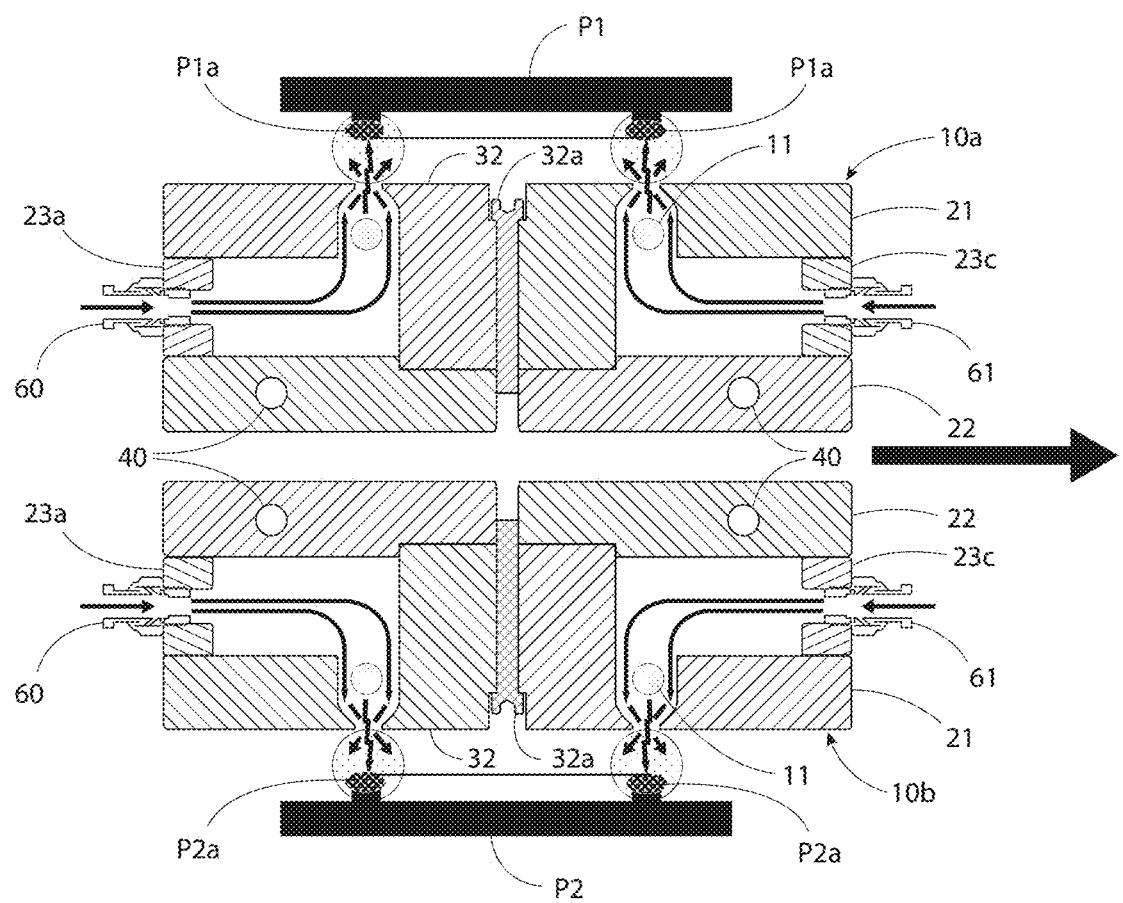
FIG. 2 is the same sectional view shown in FIG. 1, illustrating the melting of the portions of the two thermoplastic parts to be welded.
Figure 3:
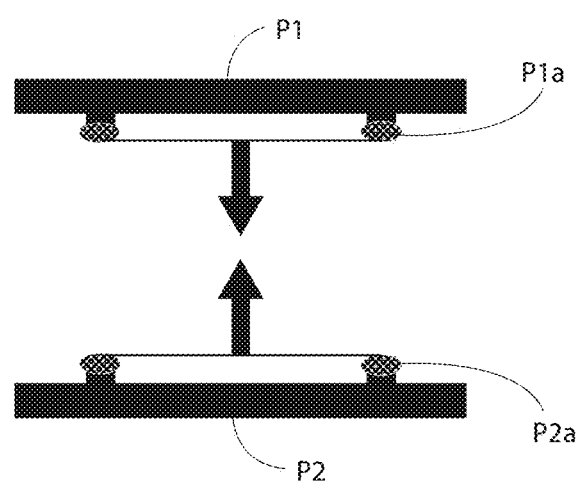
FIG. 3 is the same sectional view of the thermoplastic parts shown in FIG. 1, with the radiant heating units removed and showing the parts to be welded moving toward each other.
Figure 4:
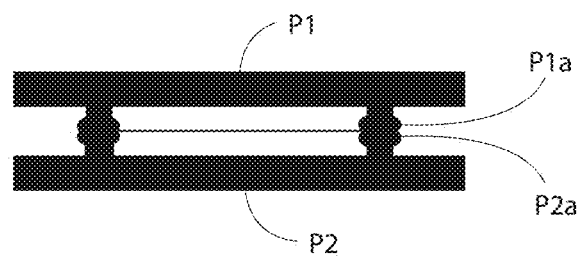
FIG. 4 is the same section view shown in FIG. 1, after the parts to be welded have been pressed against each other to join the portions of the parts melted by the infrared heating.
Figure 5:
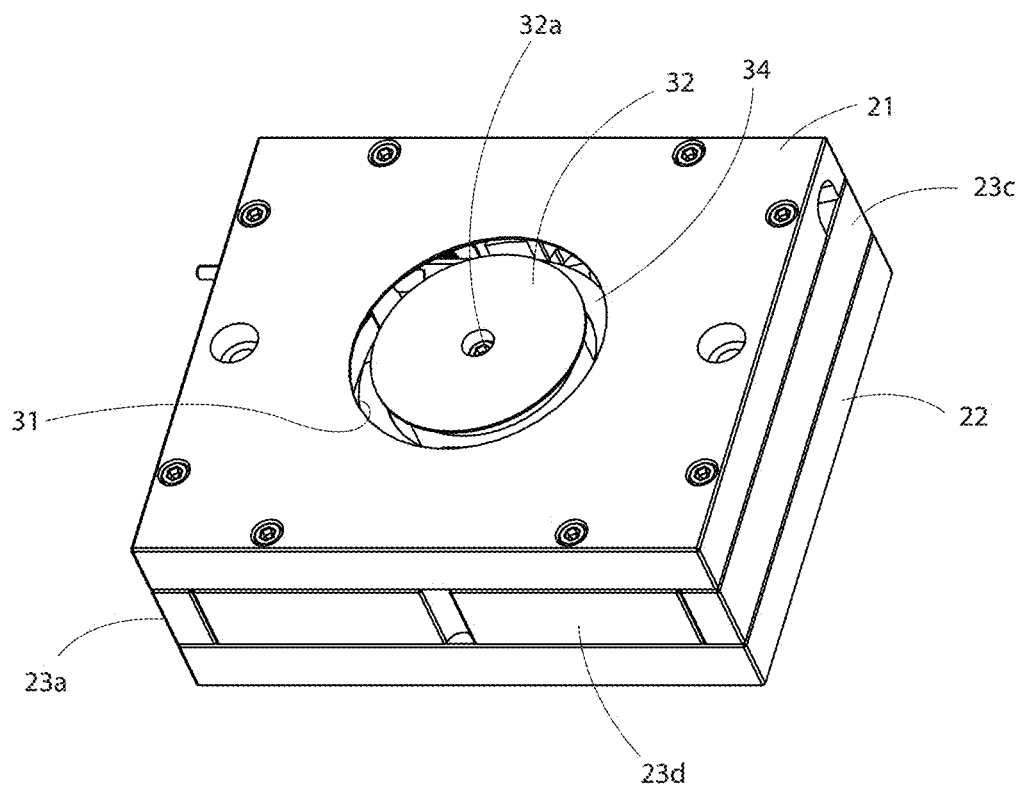
FIG. 5 is a top perspective view of one of the two radiant heating units shown in FIGS. 1 and 2.
Figure 6:
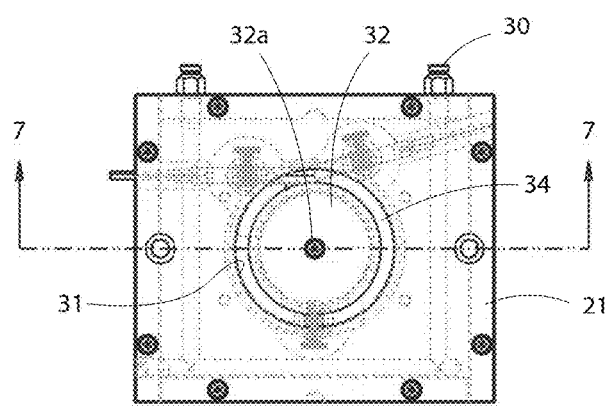
FIG. 6 is a reduced top plan view of the unit shown in FIG. 5.
Figure 7:
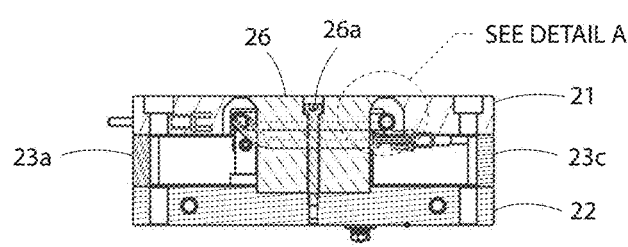
FIG. 7 is a section taken along line 7-7 in FIG. 6.
Figure 8:
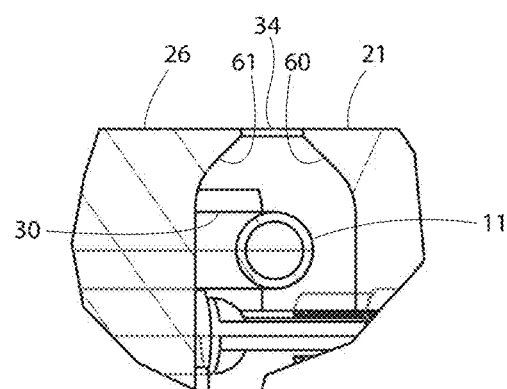
FIG. 8 is an enlarged view of the portion of FIG. 7 identified as "Detail A."
Figure 9:
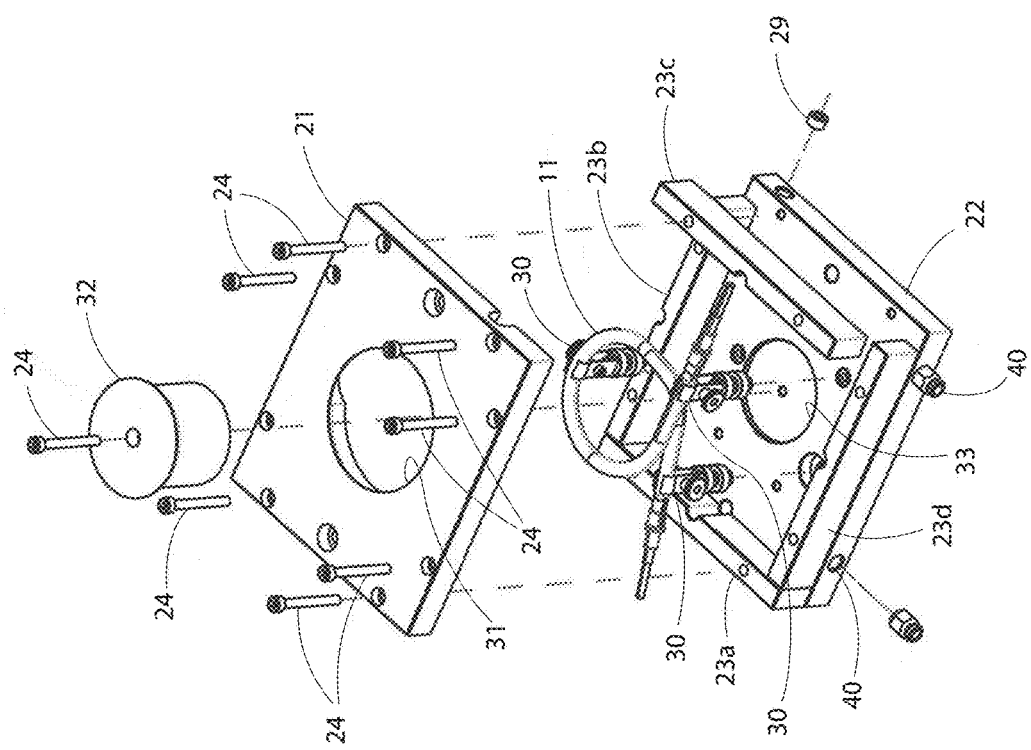
FIG. 9 is an exploded perspective of the system shown in FIGS. 5-8.

Each of the heating units 10*a* and 10*b* contains an infrared heating coil 11, typically made of quartz surrounding a resistive element that is energized by passing an electrical current through it. In each heating unit, the heating coil 11 is contained within a central opening 31 in a front shielding plate 21. A parallel rear shielding plate 22 is spaced apart from the front plate 21 by four shielding side bars 23*a*-23*d*. Multiple screws 24 fasten the two plates 21 and 22 tightly against opposite sides of the side bars 23*a*-23*d*, as can be seen in FIG. 9. The shielding side bars 23*a*-23*d* hold the two plates 21 and 22 spaced apart from each other, as can be seen in FIGS. 1 and 2.

The shielding plates 21, 22 and side bars 23*a*-23*d* are typically made of aluminum or a similar material that serves two distinct functions. One function is to protect areas of the thermoplastic parts P1 and P2 and surrounding elements that should not be heated. They also function to protect the integrity of the heating coil 12.

In each of the heating units 10, the infrared heating coil 11 is supported by three clamps 30 mounted on the rear shielding plate 22. The clamps 30 position the coil 11 within the central opening 31 of the front shielding plate 21, which also receives a shielding cylinder 32. The cylinder 32 extends through the opening 31 and the heating coil 11, and into a recess 33 in the central portion of the rear shielding plate 22. The cylinder 32 is held in place by a screw 32a that passes through a central hole in the cylinder 32 and is threaded into a matching threaded hole in the rear shielding plate 22.

The cylinder 32 has a diameter that is smaller than that of the opening 31 so that an annular gap 34 is formed between the cylinder 32 and the front plate 21. The infrared heating coil 11 is located within the gap 34 so that the infrared radiation from the coil 11 passes through the gap 34 and onto the adjacent part to be melted for welding.

Attached to the bottom of each pair of shielding plates 21 and 22 is a water-cooled heat sink 40 that includes a passageway 41 for circulating cooling water to draw heat by conduction out of the shielding elements 21, 22 and 23a-23d. This further protects the surrounding components and the thermoplastic part to be welded.

Adjacent the outer end of the gap 34, the opposed surfaces 60 and 61 of the plate 21 and the cylinder 32 taper toward each other, so that the width of the outer end of the gap is about the same as the width of the protruding portion of the part to be welded. The surfaces 50 and 51 are polished to form reflective surfaces so that infrared radiation from the heating coil 11 is channeled up through the gap 34 toward the surface of that portion of the thermoplastic part to be melted.

At least the ribs P1a and P2a of the respective parts P1 and P2 are preferably made entirely of thermoplastic material so that the surface portions of those ribs are melted quickly, and form a strong weld joint when cooled and solidified. For example, the ribs P1a and P2a may be heated for a total of 20 seconds, which is sufficient time to melt the opposed surface portions of the ribs.

To avoid combustion of the thermoplastic material as it is melted by the infrared radiation, a pressurized non-heated inert gas such as nitrogen is dispensed into the space around that portion of the thermoplastic material that is being melted. The inert gas is fed into the space between the shielding plates 21 and 22 through ports 60 and 61 in the side bars 23a and 23c, as can be seen in FIGS. 1 and 2.

The inert gas is dispensed from the heating unit 10 through the same gap 34 through which the infrared radiation passes from the heating coil 11 to the part being melted. The tapered surfaces of the plate 21 and the cylinder 32 direct the pressurized inert gas into the space around the part being melted by the infrared radiation, as depicted by the stippled circular areas in the sectional views in FIGS. 1 and 2.

The inert gas is dispensed under a small pressure to produce a consistent flow of the gas out of the gap 34 and onto the weld zone of the thermoplastic material. The flow rate of the shielding inert gas should be sufficient to prevent oxidation of the thermoplastic material as it is melted, thereby preventing any combustion of the thermoplastic material being melted.

The pressurized inert gas is fed into the space between the two plates 21 and 22 through two ports 60 and 61 on opposite sides of that space. The inert gas then flows along both sides of the infrared heating coil 11 and exits through the same annular gap 34 through which the infrared radiation exits. The walls of the annular gap 34 are tapered toward each other adjacent the exit end of the gap 34.

After the portions of the parts P1 and P2 to be welded to each other are at least partially melted by the infrared radiation, the heating elements are withdrawn from between the parts P1 and P2, and the ribs P1a and P2a of the two parts are pressed into engagement with each other so that the melted surfaces of the two parts P1 and P2 become integrated with each other. Vertical movement of the parts P1 and P2 is preferably controlled by at least one servo-controlled actuator.

After the softened portions of the parts P1 and P2 are pressed into engagement with each other, the parts are cooled and solidified. The parts with the melted surfaces remain clamped tightly together while they cool and solidify in the absence of the IR heating. Thus, the weld is completed by allowing the parts P1 and P2 to cool under pressure, thereby solidifying the thermoplastic material that was melted. The final welded product is then unclamped and removed from the welding station.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

The invention claimed is:

1. An infrared welding method for joining portions of two parts made of thermoplastic material, said method comprising:
    positioning the two thermoplastic parts adjacent an infrared heater with the two parts spaced from each other;
    melting at least portions of the opposed surfaces of said parts by energizing the infrared heater to emit infrared radiation and directing the emitted infrared radiation onto the surfaces of the two parts to be joined directly together, said infrared heater being shielded by a shield assembly to confine the infrared radiation to the thermoplastic part being welded;
    directing a non-heated inert gas into the shield assembly, around the infrared heater, and then out of a gap in the shield assembly onto the surface or surfaces of said thermoplastic parts receiving said infrared radiation at a flow rate sufficient to prevent oxidation of said thermoplastic parts as they are melted and thereby prevent any combustion of the thermoplastic material being melted;
    clamping the two parts together by moving at least one of said parts toward the other of said parts to press the melted surfaces of said parts directly into contact with each other; and
    cooling the two parts while they remain clamped together, in direct contact with each other, to solidify the molten thermoplastic material and thus weld the two parts together.

2. The infrared welding method of claim 1, wherein said two parts are aligned with each other during said melting and clamping.

3. The infrared welding method of claim 1, wherein said opposed surfaces of said thermoplastic parts are heated by two separate infrared heaters.

4. The infrared welding method of claim 1, wherein said infrared radiation and said non-heated inert gas are directed onto each surface to be melted from the same location.

5. The infrared welding method of claim 1, wherein said non-heated inert gas envelopes each surface melted during the heating and melting of that surface.

6. The infrared welding method of claim 1, wherein the energizing of said infrared heater is terminated after a predetermined time interval.

7. The infrared welding method of claim 1, wherein the directing of said non-heated inert gas onto the surfaces of said thermoplastic parts is terminated after the energizing of said infrared heater is terminated.

8. The infrared welding method of claim 1, wherein said non-heated inert gas surrounds the infrared radiation directed onto said parts.

* * * * *